United States Patent [19]

Flego

[11] 4,337,430
[45] Jun. 29, 1982

[54] INDUCTIVE-LOAD POWER CONTROL CIRCUIT

[75] Inventor: Steven E. Flego, Portland, Oreg.

[73] Assignee: Electronics Diversified, Inc., Portland, Oreg.

[21] Appl. No.: 228,324

[22] Filed: Jan. 26, 1981

[51] Int. Cl.³ .............................................. G05F 5/00
[52] U.S. Cl. ................................ 323/323; 307/252 T; 323/325; 323/902
[58] Field of Search .............................. 323/320–327, 323/902; 315/DIG. 4; 307/252 T

[56] References Cited

U.S. PATENT DOCUMENTS

| | | | |
|---|---|---|---|
| 3,936,726 | 2/1976 | Kelley | 307/252 T |
| 4,122,384 | 10/1978 | Suzuki | 323/326 |
| 4,260,948 | 4/1981 | Okado | 307/252 T |

Primary Examiner—William H. Beha, Jr.
Attorney, Agent, or Firm—Chernoff & Vilhauer

[57] ABSTRACT

A circuit for controlling power delivery to different AC inductive loads, which loads create different respective lag angles between applied voltage and delivered current up to a known maximum lag angle. Included is a switching circuit, typically including silicon-controlled rectifiers, connected to the load. The switching circuit is trigger-pulse-switched into conduction, and thereafter maintained in conduction so long as current through the load exceeds a certain minimum value. Additionally, a trigger-pulse generator connected to the switching circuit operates in two modes. In one mode, the conduction angle is less than a predetermined maximum width which is no less than the maximum lag angle. In this mode, a pulse is generated whose width is essentially equal to the conduction angle. In the other mode, the conduction angle is no less than the maximum width, and the generated pulse has a fixed width substantially equaling the maximum width.

3 Claims, 4 Drawing Figures

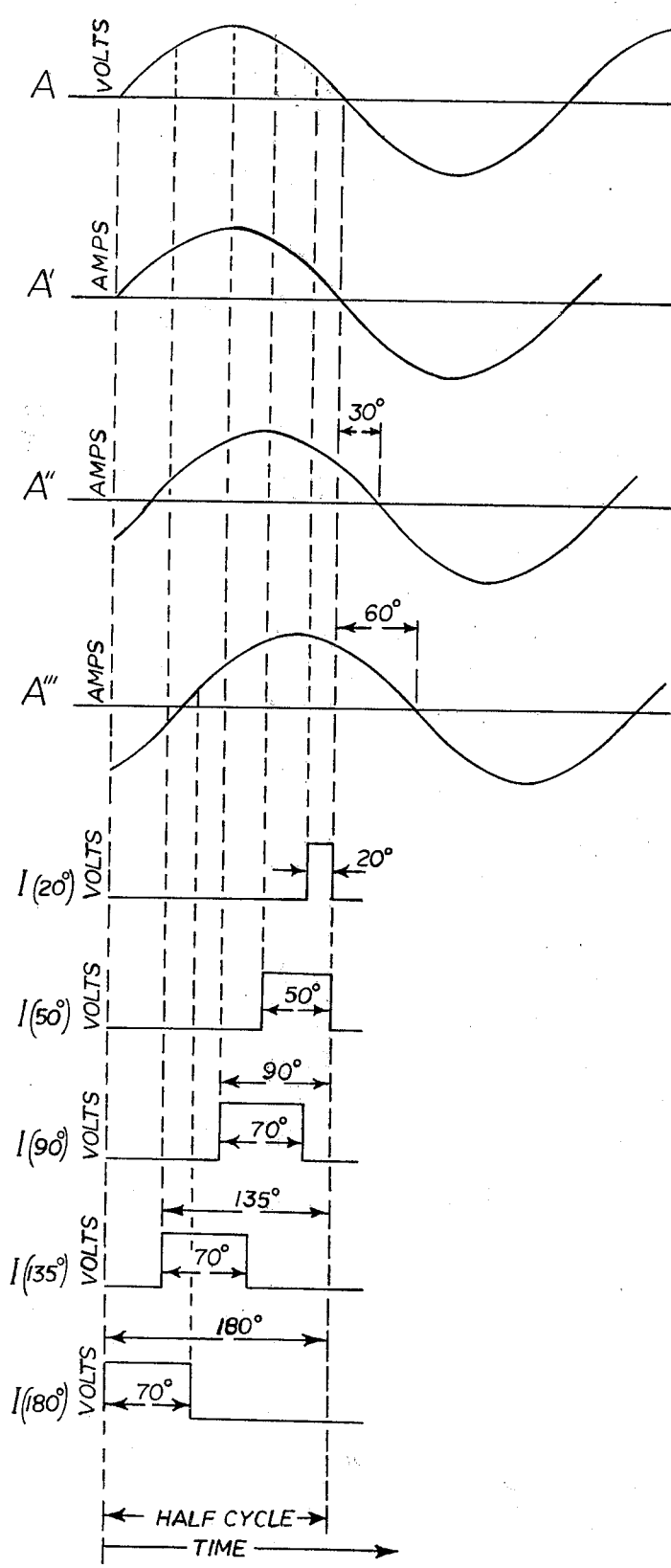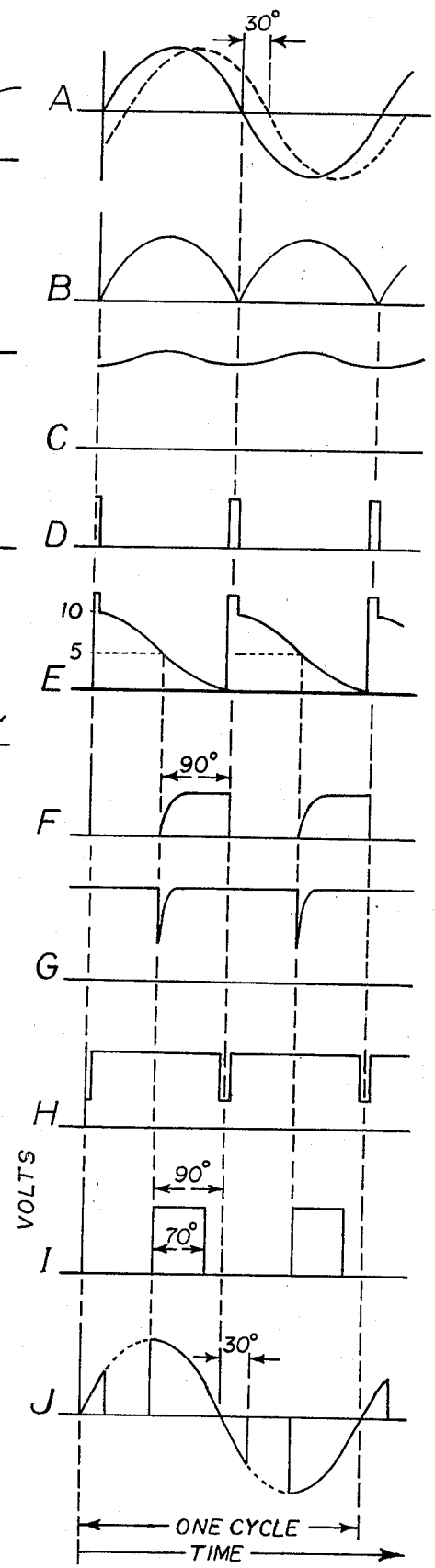
FIG. 3
FIG. 4

4,337,430

INDUCTIVE-LOAD POWER CONTROL CIRCUIT

BACKGROUND AND SUMMARY OF THE INVENTION

This invention pertains to a power control circuit, and more particularly to a circuit for controlling power delivery to different AC loads by trigger-pulse-controlling a switching circuit.

When AC loads are reactive, with inductance predominant in the reactance, current lags voltage by an amount which is related to the proportion of inductance to resistance in the load. This situation occurs for many common types of AC loads, such as fluorescent lamp ballasts, motors and transformers. When these types of loads are used with solid-state dimming components, such as silicon-controlled rectifiers (SCR's), triacs or transistors, it becomes necessary to allow for the current lag relative to voltage.

SCR's, which are commonly used to control the supply of AC power to a load, allow the conduction of a positive current after they have been turned on by a suitable trigger pulse. Conduction will be initiated if a positive current flow exists when the trigger pulse is applied. Once in a conducting state, an SCR will continue to conduct until the current flow reaches a minimum positive value determined by the SCR characteristics.

The conduction angle is that portion of a half cycle of voltage during which it is desired to cause an SCR to conduct. Thus, a conduction angle of 120° would indicate that conduction should begin 60° after initiation of the half cycle and continue to its end. For larger conduction angles, during which conduction is desired over most of the half cycle, if a short duration triggering pulse is applied, it may occur while the voltage is positive but the current is negative, thereby preventing conduction of the SCR. In order to overcome this situation, circuits conventionally provide a triggering pulse equal to the conduction angle. Thus, the triggering pulse is maintained even after the current changes from negative to positive.

Due to the current lag, the SCR conducts for a period of time equal to the conduction angle plus the lag angle minus any initial portion of the conduction angle during which current is negative. As an example, assume that a circuit has a lag angle of 60° and a conduction angle of 150°. Since the current becomes positive 60° after the voltage, it is negative for the first 30° of the conduction angle (150°−(180°−60°)=30°). The SCR will conduct for 150° plus 60° less 30° or 180°—the full half cycle of positive current flow.

It can therefore be seen that a conventional power control circuit of the type herein described provides a triggering pulse equal to the conduction angle when in fact it is only necessary to apply a pulse sufficient in length to assure existence of the pulse when the current becomes positive.

It is therefore a general object of this invention to provide a trigger-pulse-controlled circuit which uses less energy in controlling the switching circuit than conventional circuits.

More specifically, it is an object of this invention to provide a circuit controlled by a triggering pulse having a maximum width which is no less than a known maximum lag angle for the circuit.

The preferred embodiment of this invention includes a switching circuit which utilizes silicon-controlled rectifiers for controlling power delivery, and a trigger-pulse generator which generates a pulse having a maximum width which is no less than a known maximum phase lag for the types of loads which may be connected to the circuit.

In such a circuit, it can be seen that for large conduction angles, the triggering pulse will always exist when the current switches from a negative to a positive direction. Additionally, it only uses enough energy to produce a pulse which will cover essentially all lag angle conditions.

These and additional objects and advantages of the present invention will be more clearly understood from a consideration of the drawings and the detailed description of the preferred embodiment.

BRIEF DESCRIPTION OF THE DRAWINGS

FIG. 3 is a series of common-time-scale graphs, the upper four of which illustrate different voltage/current lag conditions, and the lower five of which illustrate different SCR triggering pulses produced under different operating conduction-angle conditions called for in the circuit of FIGS. 1 and 2.

FIG. 4 is another series of common-time-scale graphs illustrating different wave forms which exist at different points in the circuit of the invention under a circumstance where voltage/current lag corresponds to one of the conditions shown for such lag in FIG. 3, and where the called-for conduction angle corresponds to one of those also illustrated in FIG. 3.

DETAILED DESCRIPTION OF THE INVENTION

Figure 1:
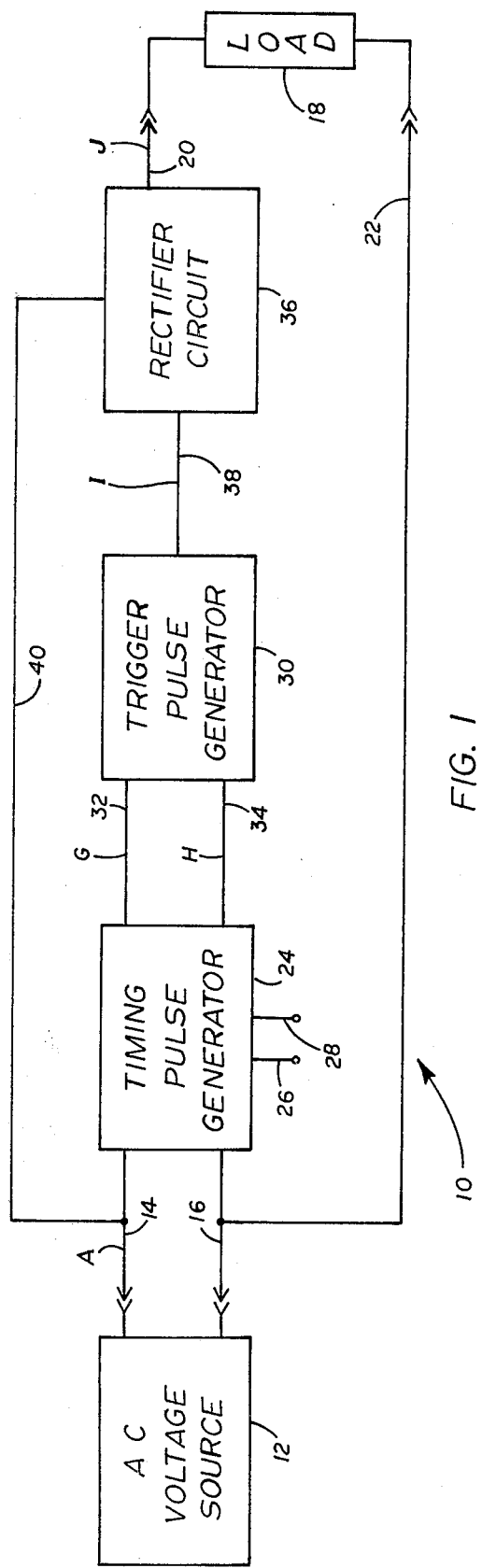
FIG. 1 is a very simplified block diagram illustrating the invention in use with a circuit for delivering power to an AC load.

Referring to FIG. 1, shown generally at 10 is an inductive-load power control circuit constructed in accordance with the present invention. Control circuit 10 is connected between an AC voltage source 12 through input terminals 14, 16 and an AC inductive load 18 through output terminals 20, 22. Included in circuit 10 is a timing pulse generator 24 connected as shown to input terminals 14, 16. Also connected to generator 24 are two control terminals 26, 28. A trigger-pulse generator 30, also referred to herein as trigger-pulse generating means, is connected to generator 24 through conductors 32, 34. A rectifier circuit 36, also referred to as switching means, is connected to generator 30 by means of a conductor 38. It is also connected to input terminal 14 through a conductor 40. Additionally, rectifier circuit 36 is connected to load 18 through output terminal 20. Finally, input terminal 16 is directly connected to output terminal 22.

Timing pulse generator 24 and trigger-pulse generator 30 cooperate to form what is referred to herein as a conduction control circuit.

Figure 2:
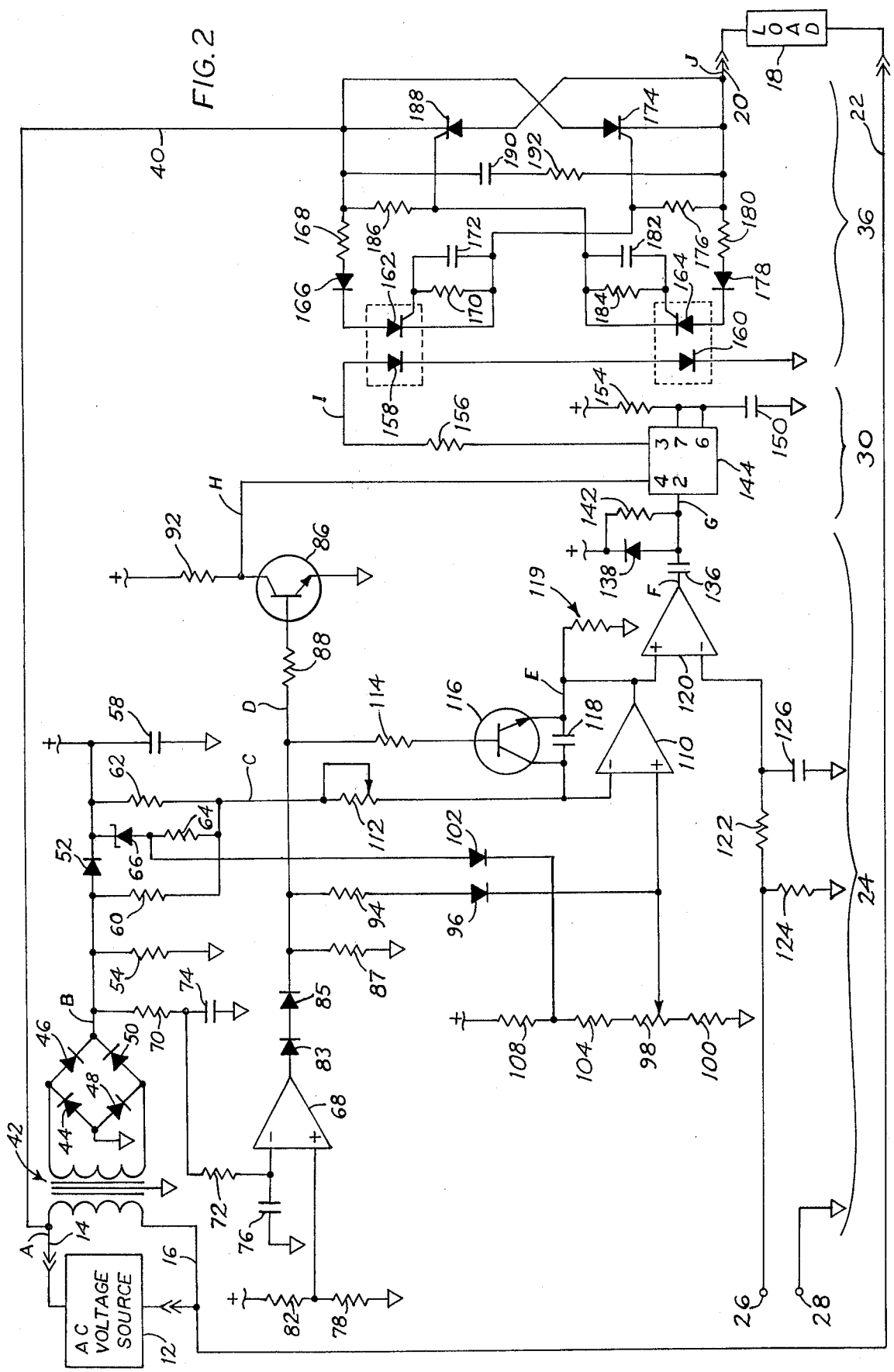
FIG. 2 is a detailed schematic diagram of what is shown in FIG. 1.

Referring now to FIG. 2 and describing in detail the preferred embodiment of this invention, input terminals 14, 16 are connected to the primary side of a step-down transformer 42, having a grounded core. The secondary side of transformer 42 is connected to a full-wave rectifier which includes diodes 44, 46, 48, 50. The anodes of diodes 44, 48 are grounded. The cathode of diode 44 and the anode of diode 46 are both connected to one secondary terminal of transformer 42. Similarly, the cathode of diode 48 is connected to the anode of diode 50, which connection is connected to the other secondary terminal of transformer 42. The cathodes of diodes 46, 50 are connected together, which connection is further connected to the anode of a diode 52, as well as to ground through resistor 54.

The cathode of diode 52 is connected to a positive DC voltage source as shown, and also to ground through a capacitor 58. The anode of diode 52 is connected to its cathode through resistors 60, 62. The junction between resistors 60, 62 is connected to resistor 64 which is connected in turn to the anode of a Zener diode 66. The cathode of diode 66 connects with the cathode of diode 52.

The junction between the cathodes of diodes 46, 50 is further connected to the negative terminal of a comparator 68 through series resistors 70, 72 whose junction is grounded through a capacitor 74. In a similar fashion, the negative terminal of comparator 68 is connected to ground through a capacitor 76. A single operational amplifier, such as National Semiconductor Model LM 741 or equivalent, may be used as comparator 68.

The positive terminal of comparator 68 is biased positively through a dividing circuit including resistors 78, 82 which extend between the ground and the positive voltage source already mentioned. The output of comparator 68 is joined to the base of a transistor 86 through two series diodes 83, 85 and a resistor 88. The junction between diode 85 and resistor 88 is connected to ground through a resistor 87.

The collector of transistor 86 is connected to the previously mentioned DC voltage source through a resistor 92. Its emitter is grounded.

The output of comparator 68 is also connected to ground through a resistor 94, a diode 96, a potentiometer 98 and a resistor 100, in that order. Diode 96 is attached to the center tap of potentiometer 98.

The junction between resistor 64 and Zener diode 66 is joined to the junction between two resistors shown at 104, 108 through a diode 102. Resistor 108 is connected as shown to the above-identified DC voltage source.

The junction between resistors 60, 62 is attached to the negative terminal of an integrator 110 through a variable resistor 112. The positive terminal of integrator 110 is connected to the junction between diode 96 and the wiper in potentiometer 98.

The output of comparator 68 is also connected to the base of a second transistor 116 through a resistor 114. The collector of transistor 116 is attached to the junction between resistor 112 and the negative terminal of integrator 110. The emitter of transistor 116 and the output of integrator 110 are are both connected to ground through a resistor 119. A capacitor 118 is connected between the collector and emitter of transistor 116.

The output of integrator 110 is further joined to the positive terminal of a second integrator 120. The negative terminal of integrator 120 is connected to ground through resistors 122, 124, and is also connected to ground through a capacitor 126. The junction between resistors 122, 124 is connected to control terminal 26. The second control terminal 28 is grounded.

Integrators 110, 120 are operational amplifiers and both maybe part of a dual operational amplifier, such as National Semiconductor model LM 358.

Output signals from integrator 120 are coupled to one side of a capacitor 136, the other side of which is connected to the DC voltage source through the parallel combination of a diode 138 and a resistor 142. This other side of capacitor 136 is also attached to terminal 2 of a pulse-generating timer 144, such as the model LM555 timer produced by National Semiconductor. Terminal 4 is joined to the junction between the collector of transistor 86 and resistor 92. Terminals 6 and 7 are connected jointly through a capacitor 150 to ground and are connected to the DC voltage source previously described through a resistor 154. Finally, terminal 3 of timer 144 is connected to ground through a resistor 156 in series with two light-emitting diodes (LED's) 158, 160.

Each of these LED's is a part of what is termed an optoisolator in which an SCR is associated with and senses a light beam from the associated LED. Thus, LED's 158, 160, have associated with the light-sensing SCR's 162, 164, respectively.

The anode of SCR 162 is connected to conductor 40 through a diode 166 and a resistor 168. The gate and cathode of SCR 162 are joined through a resistor 170 and a capacitor 172 connected in parallel. The cathode of SCR 162 is further connected to the gate of a power SCR 174, and to output terminal 20 through a resistor 176.

The circuitry just described for SCR 162 is similar to that associated with SCR 164. The anode of SCR 164 is connected through a diode 178 and a resistor 180 to output terminal 20. A capacitor 182 and a resistor 184 are connected in parallel between the SCR's gate and cathode. Additionally, the cathode in SCR 164 connects through a resistor 186. with previously mentioned conductor 40. The junction between resistor 186 and SCR 164 is connected to the gate of a second power SCR 188. Power SCR's 174, 188 are also referred to herein as switching devices.

Conductor 40 is attached to the cathode of SCR 188 and to the anode of SCR 174. Output terminal 20 is attached to the cathode of SCR 174 and to the anode of SCR 188. Conductor 40 is further joined to output terminal 20 through a capacitor 190 and a resistor 192.

Explaining operation of the circuits and continuing to refer to FIG. 2, it can be seen that AC voltage source 12 is connected to load 18 through SCR's 174, 188. If it is assumed that the SCR's are always in a conducting state, then when conventional current is flowing out of output terminal 20 into load 18 SCR 174 is conducting. This will subsequently be referred to as a positive current. When the current is in a reverse direction, SCR 188 is conducting. The amount of power that is transmitted to load 18 is therefore controllable by controlling the amount of time that each power SCR conducts.

The letter designations of the graphs illustrated in FIGS. 3 and 4 correspond to wave forms which exist at the points in the circuits shown in FIGS. 1 and 2 having the same letter designations.

The input voltage wave form applied to terminals 14, 16 is illustrated in FIG. 3 by the wave form designated as A. During the first half cycle, voltage is positive and during the second half cycle, is negative. The three wave forms, designated as A', A", A''', illustrate three possible currents for three different types of loads. Wave form A' shows a current which is directly in phase with the voltage indicating that there is no reactive component in the load. Wave forms A" and A''' show current wave forms which lag the reference voltage shown in wave form A by 30° and 60°, respectively. Referring to the left portion of each graph it can be seen that an increase in lag angle is indicated by a shift of the zero crossing of current to the right.

Graph A of FIG. 4 shows as a solid line an assumed voltage applied across input terminals 14, 16 of FIGS. 1 and 2. The wave form of graph A in FIG. 4, shown as a dashed line, represents a current wave form lagging voltage by 30° as illustrated in the equivalent wave form A″ in FIG. 3.

Transformer 42 produces a secondary voltage of about 15-volts with a wave form similar to wave form A in FIG. 4. This voltage is applied across the full wave rectifier having diodes 44, 46, 48, 50. The output is illustrated by wave form B in FIG. 4.

The output of the full wave rectifier is transmitted through diode 52 when the diode is forward biased. The voltage on capacitor 58 increases up to the voltage peak, and then discharges slowly. Graph C of FIG. 4 illustrates the wave form which results at the junction between resistors 62, 112.

In the situation where the line voltage decreases, the DC voltage source also decreases. This is reflected in a corresponding voltage drop on the negative terminal of integrator 110. The positive terminal voltage needs to be decreased, too, in order for integrator 110 to function properly. This is accomplished with voltage regulation provided by Zener diode 66, resistor 64 and diode 102 which alter the current through potentiometer 98 and therefore the voltage across it.

The output of the full wave rectifier is also connected to the negative terminal of comparator 68. As discussed previously the positive terminal of comparator 68 is connected to a positive voltage source 80 through resistor 82. Comparator 68 only produces an output if the negative terminal is at a voltage potential less than the positive terminal. By setting the positive terminal voltage at a low value, an output pulse is generated when the negative terminal voltage approaches zero. Comparator 68 therefore functions as a zero-crossing indicator as shown by wave form D in FIG. 4.

The zero crossing pulses are applied to the base of transistor 116, causing it to conduct during each pulse. This essentially shorts out capacitor 118, allowing current to pass through. The result is the spike at the leading edge of each half cycle wave form shown in graph E of FIG. 4. At the termination of the zero-crossing pulse, the voltage at the output of integrator 110 drops to a value set by the tap on potentiometer 98 which is applied to the positive terminal of integrator 110. In the present preferred embodiment of this invention, this value is set at 10-volts.

Between pulses, resistor 112, capacitor 118 and integrator 110 cooperate to function as an active integrator. Since the voltage above resistor 112 in FIG. 2 is higher than it is below the resistor, a positive current flows through it. This positive current produces a negative ramp at the output of integrator 110 which is essentially a negative integral of the wave form shown in graph C of FIG. 4. This voltage wave form is illustrated in graph E of FIG. 4.

Wave form E is applied to the positive terminal of integrator 120. A positive DC voltage is applied to the negative terminal through control terminal 26. Integrator 120 begins functioning when the positive terminal voltage is equal to that on the negative terminal. The resulting wave form at the output of integrator 120 is the integral of wave form E for the period of time it was functioning. Assuming a reference voltage of five volts, with a ten volt maximum possible, the resulting pulse produced by integrator 120 is approximately one quarter of a cycle, or 90° in width. Thus pulse, shown in graph E of FIG. 4, is equal to the conduction angle. By varying the control voltage between zero volts and ten volts, conduction angles between 0° and 180° can be produced.

The RC circuit between the output of integrater 120 and terminal 2 of timer 144, is a negative differentiator. A positive DC voltage is applied to terminal 2 through resistor 142. At the beginning of the conduction angle pulse the voltage on terminal 2 of the timer drops instantaneously. It then returns to the steady-state voltage as capacitor 136 recharges. Thus, the input to terminal 2 is a negative-going pulse indicating the initiation of the conduction angle. These pulses, also referred to as first timing pulses, are illustrated in wave form G in FIG. 4. The circuitry used to generate them is referred to herein as means for generating a first timing pulse.

Wave form D is also applied to the base of transistor 86. This causes the transistor to conduct during the period of the pulse. Thus, the voltage level of the collector of transistor 86 remains at a high positive level between pulses and drops negatively during the pulse, as shown by wave from H in FIG. 4. Terminal 4 of timer 144 receives these pulses, which are also referred to herein as second timing pulses. They are generated by a circuit referred to as means for generating a second timing pulse.

Timer 144 begins a rectifier triggering pulse on terminal 3 when a pulse is received on terminal 2. The triggering pulse continues until one of two controls terminates it. The first is a negative going pulse on terminal 4 which prevents the pulse from extending beyond a zero crossing of voltage. The second is a maximum width control provided by the RC circuit connected to terminals 6, 7 of timer 144. The time constant associated with this RC circuit is equal to the maximum pulse width. This circuit is also referred to herein as means fixing the width of the triggering pulse equal to the maximum width.

It has been found that in dimmer circuits for fluorescent lights that the maximum lag angle between current and voltage through the load is approximately 60°. A pulse width not less than 60° would then provide a pulse which would assure conduction of the SCR's for conduction angles approaching 180°.

An important feature of this invention is this capability of producing a variable-width sliding pulse. For conduction angles less than the maximum width, infinitely width-variable triggering pulses are generated having widths equal to the conduction angle. In such a case, pulse initiation is controlled by a first timing pulse. Termination is controlled by the second timing pulse. Thus, the triggering-pulse is made equal to the conduction angle.

When the conduction angle is greater than the maximum width of the triggering pulse, the triggering pulse is initiated by the first timing pulse and is terminated once the maximum width has been reached. Therefore, as the conduction angle increases, the triggering pulse, having a fixed width, in effect travels to the left, nearer the beginning of the half cycle.

This variable-width sliding triggering pulse concept may be illustrated by referring to the various graphs in FIG. 3 designated as I. In each graph, the conduction angle is equal to that portion of the half cycle from the left edge of the pulse to the right end of the half cycle. It is assumed, for purposes of illustration, that load current lags voltage by 60°. The associated voltage curve is shown in graph A and the corresponding current wave form is shown in graph A'''. A fixed width pulse of 70° is chosen to illustrate clearly the advantage of having a triggering pulse width greater than the current-to-voltage lag angle. Graph I(20°) illustrates a triggering pulse having a width of 20° which is also equal to the conduction angle. Since this is less than the maximum pulse width of 70° it terminates with the zero voltage crossing. Similarly, conduction angle of 50° results in a triggering pulse having a width equal thereto, as shown in Graph I(50°).

For conduction angles greater than 70°, the triggering pulse terminates prior to the voltage zero crossing. Examples of this are shown in the graphs designated as I(90°), I(135°) and I(180°), for conduction angles equal to the parenthetical value in each case. The advantage of having a maximum pulse width greater than the lag angle is illustrated in the latter two wave forms. In graph I(135°), the pulse begins when current is still negative, and lasts well into the positive current portion of wave form A'''. For the maximum conduction angle of 180°, the triggering pulse begins at the initial zero voltage crossing as shown by graph I(180°). Since the pulse continues for 70° and the current becomes positive after 60°, the pulse exists concurrently with a positive current for a very short period of time. This is sufficient to put the associated SCR in a state of conduction.

As previously stated, timer 144, also referred to herein as trigger-pulse generating means, produces a triggering pulse on terminal 3. This pulse is conveyed to SCR's 162, 164 by LED's 158, 160. The use of the optoisolators is for user safety in that it isolates the low voltage control circuits from line transients.

A pulse received by SCR's 162, 164 is transferred to the gates of SCR's 174, 188. If the load current is also positive, SCR 174 will conduct. Conversely, SCR 188 will conduct when the load current is negative. Thus, even though a triggering pulse is applied to both SCR's only one will in fact conduct at a time.

In order for an SCR to operate properly, it must be in a non-conducting state for a sufficient period of time to charge and discharge. Gating circuits for other kinds of loads have been proposed in the past which utilize a single SCR to control AC current with other circuitry to determine the direction of current flow. However, as conduction angles become large, for example 150° and larger, the large conduction angle begins to crowd the time of non-conduction, and therefore begins to threaten proper functioning of the SCR. As has just been described, the circuit disclosed in the preferred embodiment of this invention avoids this problem by using two independently fired SCR's, each handling a half cycle of operation. Thus, there can never be a case where an SCR has any less than a full half cycle of non-conduction. This avoids the commutation problem inherent in using a single SCR.

As has been discussed previously, when a gating pulse and a positive current flow occur simultaneously in an SCR, it begins conducting and continues to conduct until the current reaches a minimum level. The wave form resulting from a 70° triggering pulse and a 90° conduction angle is illustrated by wave form J of FIG. 4. SCR 174 begins conducting at 90° at which time the load current, having a 30° lag angle relative to the load voltage, is positive. This SCR continues to conduct until the current reaches a minimum level, which for purposes of illustration, has been assumed to be zero amps. SCR 188, having reverse polarity, conducts while the current is negative.

It can be seen that the preferred embodiment of this invention provides a trigger-pulse switched circuit for controlling power to an AC load. The triggering pulses for the SCR's are conduction angle controlled by a rectifier triggering pulse. The maximum pulse width can be set equal to or greater than the maximum lag angle between load voltage and current. Thus, energy use is limited to that required to produce a triggering pulse sufficient to assume conduction of each SCR. For conduction angles less than the maximum width, the triggering pulse is equal to the conduction angle. Otherwise, it is equal to the maximum width.

While the invention has been particularly shown and described with reference to the foregoing preferred embodiment, it will be understood by those skilled in the art that other changes in form and detail may be made therein without departing from the spirit and scope of the invention as defined in the following claims.

It is claimed and desired to secure by Letters Patent:

1. In a circuit employing conduction-angle control for delivering variable power to different AC inductive loads, which loads create different respective lag angles between applied voltage and delivered current up to a known maximum lag angle switching means connectible to such a load including a switching device which is trigger-pulse-switched into conduction, and thereafter maintained in conduction so long as current through the device exceeds a certain minimum value, and trigger-pulse generating means operatively connected to said device for switching the same, said generating means having one mode of operation at conduction angles less than a predetermined maximum width which is no less than said maximum lag angle wherein it generates infinitely width-variable triggering pulses up to said maximum width, and another mode of operation at conduction angles greater than said maximum width wherein it generates substantially fixed-width triggering pulses each having a width substantially equaling said maximum width.

2. In a circuit for delivering variable power to different AC inductive loads, which loads create different respective lag angles between applied voltage and delivered current up to a known maximum lag angle silicon-controlled rectifier means or the like connectible to such a load, and a conduction control circuit operatively connected to said rectifier means for controlling conduction therein, including means for generating a rectifier triggering pulse for each half cycle of voltage, said pulse having a width substantially equal to the conduction angle when such angle is less than a predetermined maximum width which is no less than the known maximum lag angle, and substantially equal to said maximum width otherwise, the initiation of each triggering pulse occurring when the time period remaining in the corresponding half cycle of voltage substantially equals the conduction angle.

3. In a circuit for delivering variable power to different AC inductive loads, which loads create different respective lag angles between applied voltage and delivered current up to a known maximum angle silicon-controlled rectifier means or the like connectible to such a load, and a conduction control circuit operatively connected to said rectifier means for controlling conduction therein, including means for generating a rectifier triggering pulse for each half cycle of voltage, means for generating a first timing pulse for each half cycle corresponding to initiation of a conduction angle for controlling initiation of said triggering pulse, and a second timing pulse for each half cycle corresponding to termination of said conduction angle for controlling termination of said triggering pulse when said conduction angle is less than a predetermined maximum width which is no less than said maximum lag angle, and means fixing the maximum triggering pulse width essentially equal to said maximum width when said conduction angle is greater than said maximum width.

* * * * *